(12) United States Patent
Michael et al.

(10) Patent No.: US 9,720,713 B2
(45) Date of Patent: *Aug. 1, 2017

(54) USING HARDWARE TRANSACTIONAL MEMORY FOR IMPLEMENTATION OF QUEUE OPERATIONS

(71) Applicant: International Business Machines Corporation, Armonk, NY (US)

(72) Inventors: Maged M. Michael, Danbury, CT (US); Jing Ru Zheng, Toronto (CA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/144,251

(22) Filed: May 2, 2016

(65) Prior Publication Data

US 2016/0246578 A1 Aug. 25, 2016

Related U.S. Application Data

(63) Continuation of application No. 13/906,674, filed on May 31, 2013, now Pat. No. 9,348,621, which is a
(Continued)

(51) Int. Cl.
G06F 9/45 (2006.01)
G06F 9/455 (2006.01)
G06F 9/44 (2006.01)
G06F 9/52 (2006.01)
G06F 9/46 (2006.01)

(52) U.S. Cl.
CPC ............... *G06F 9/455* (2013.01); *G06F 8/30* (2013.01); *G06F 8/41* (2013.01); *G06F 9/4552* (2013.01); *G06F 9/467* (2013.01); *G06F 9/526* (2013.01)

(58) Field of Classification Search
None
See application file for complete search history.

(56) References Cited

U.S. PATENT DOCUMENTS 7,395,382 B1 7/2008 Moir
2007/0055960 A1 3/2007 Damron et al.
(Continued)

OTHER PUBLICATIONS

Dice, D., et al., "Simplifying concurrent algorithms by exploiting hardware transactional memory," In Proc. of 22nd Annual ACM Symposium on Parallelism in Algorithms and Architectures, SPAA '10, Jun. 13-15, 2010, p. 325-334.
(Continued)

*Primary Examiner* — Lewis A Bullock, Jr.
*Assistant Examiner* — Mark Gooray
(74) *Attorney, Agent, or Firm* — Cuenot, Forsythe & Kim, LLC

(57) ABSTRACT

Using hardware transactional memory (HTM) for queue operations includes invoking a first operation for a concurrent linked queue of an interpretive program using a Just-In-Time (JIT) compiler of a virtual machine, wherein the first operation does not use HTM, determining whether a data processing system executing the virtual machine supports HTM, and responsive to determining that the data processing system does support HTM, detecting, using a processor and within the first operation, a call to a second operation that is that is configured, in byte code, to return an indication of a failed hardware transaction. Responsive to detecting the second operation, a machine code implementation of the first operation that includes a machine code implementation of the second operation is generated. The machine code implementation of the second operation is an implementation of the first operation that does use HTM.

12 Claims, 9 Drawing Sheets

Related U.S. Application Data continuation of application No. 13/905,975, filed on May 30, 2013, now Pat. No. 9,348,620.

(56) References Cited

U.S. PATENT DOCUMENTS

| | | |
|---|---|---|
| 2014/0359562 A1 | 12/2014 | Michael et al. |
| 2014/0359609 A1 | 12/2014 | Michael et al. |

OTHER PUBLICATIONS

Basin, D. et al., "Café': Scalable task pools with adjustable Fairness and Contention", [online] In Distributed Computing, Lecture Notes in Computer Science vol. 6950, pp. 475-488, Springer Berlin Heidelberg, May 2011, 25 pg.

Nguyen, T. et al., "Per Thread Batch Queues for Multithreaded Programs", [online] 2006, 7 pg.

Bacchelli, A., et al., "RTFM (Read the Factual Mail)—Augmenting Program Comprehension with Remail," [online] In 15th European Conf. on Software Maintenance and Reengineering (CSMR), pp. 15-24, 2011, 10 pg.

U.S. Appl. No. 13/905,975, Non-Final Office Action, Jan. 15, 2015, 14 pg.

U.S. Appl. No. 13/905,975, Final Office Action, Jun. 3, 2015, 19 pg.

U.S. Appl. No. 13/905,975, Notice of Allowance, Mar. 2, 2016, 9 pg.

U.S. Appl. No. 13/906,674, Non-Final Office Action, Jan. 15, 2015, 13 pg.

U.S. Appl. No. 13/906,674, Non-Final Office Action, Jun. 3, 2015, 18 pg.

U.S. Appl. No. 13/906,674, Notice of Allowance, Feb. 29, 2016, 7 pg.

```
1    private transient volatile Node<E> head = new Node<E>(null, null);
2    private transient volatile Node<E> tail = head;
3    private volatile E item;
4    private volatile Node<E> next;
5
6    public boolean offer(E e) {
7        checkNotNull(e);
8        final Node<E> newNode = new Node<E>(e);
9        if (tmOffer(newNode)) return true
10       for (Node<E> t = tail, p = t;;) {
11           Node<E> q = p.next;
12           if (q == null) {
13               if (p.casNext(null, newNode)) {
14                   if (p != t) // hop two nodes at a time
15                       casTail(t, newNode); // Failure is OK.
16                   return true;
17               }
18           }
19           else if (p == q)
20               p = (t != (t = tail)) ? t : head;
21           else
22               p = (p != t && t != (t = tail)) ? t : q;
23       }
24   }
25
26   private boolean tmOffer(Node<E> n) {
27       return false;
28   }
```

FIG. 3

```
1   public E poll() {
2       E e = tmPoll();
3       if (e != null) return e;
4       restartFromHead:
5       for (;;) {
6           for (Node<E> h = head, p = h, q;;) {
7               E item = p.item;
8               if (item != null && p.casItem(item, null)) {
9                   if (p != h) // hop two nodes at a time
10                      updateHead(h, ((q = p.next) != null) ? q : p);
11                  return item;
12              }
13              else if ((q = p.next) == null) {
14                  updateHead(h, p);
15                  return null;
16              }
17              else if (p == q)
18                  continue restartFromHead;
19              else
20                  p = q;
21          }
22      }
23  }
24
25  private E tmPoll() {
26      return null;
27  }
```

FIG. 4

| | |
|---|---|
| 1 | private boolean tmOffer(Node<E> n) { |
| 2 | if (tbegin()) goto offerstart; |
| 3 | boolean ret = false; |
| 4 | goto offerreturn; |
| 5 | offerstart: |
| 6 | Node<E> p = this.tail; |
| 7 | Node<E> q = p.next; |
| 8 | if (q == null) goto insert; |
| 9 | p = q; |
| 10 | q = p.next; |
| 11 | if (q == null) goto insert; |
| 12 | ret = false; |
| 13 | goto offertend; |
| 14 | insert: |
| 15 | p.next = n; |
| 16 | this.tail = n; |
| 17 | ret = true; |
| 18 | offertend: |
| 19 | tend(); |
| 20 | offerreturn: |
| 21 | return ret; |
| 22 | } |

FIG. 5

```
J9 PPC JIT Code for tmOffer
        tbegin                          # if !tbegin goto return
        bne+ cr0, StartLabel
        li gr3, 0                       # ret := false
        b returnLabel
StartLabel:
        lwz gr4, [gr2, 12]              # p := tail
        lwz gr5, [gr4, 12]              # q := p.next
        cmpldi cr0, gr5, 0              # if q == null goto insert
        beq cr0, InsertLabel
        ori gr4, gr5, 0x0               # p := q
        lwz gr5, [gr5, 12]              # q := p.next
        cmpldi cr0, gr5, 0              # if q == null goto insert
        beq+ cr0, InsertLabel
        li gr3, 0                       # ret := false // giving up
        b TendLabel                     # goto tend
InsertLabel:
        stw [gr4, 12], gr0              # p.next = n
        stw [gr2, 12], gr0              # tail = n
        li gr3, 1                       # ret = true
TendLabel:
        tend                            # tend
ReturnLabel:                            # return ret
```

FIG. 6

```
J9 zHelix JIT Code for tmOffer
        xr          gpr0, gpr0          # ret := false
        tbegin                          # if !tbegin goto return
        brc         0x7, ReturnLabel
        lg          gpr1, 12(gpr9)      # p := tail
        ltg         gpr2, 12(gpr1)      # q := p.next; q == NULL?
        brc         0x8, Insertlabel    # if q == NULL goto insert
        lgr         gpr1, gpr2          # p := q
        lt          gpr2, 12(gpr1)      # q := p.next; q == NULL?
        brc         0x8, InsertLabel    # if q == NULL goto insert
        brc         0xf, TendLabel      #
InsertLabel:
        stg         gpr11,12(gpr1)      # p.next = n
        stg         gpr11,12(gpr9)      # tail = p
        lhi         gpr0, 1             # ret := true
TendLabel:
        tend                            # tend
ReturnLabel:
```

FIG. 7

```
1   private Node<E> tmPoll() {
2       if (tbegin()) goto pollstart;
3       E e = null;
4       goto pollreturn;
5   pollstart:
6       Node<E> p = this.head;
7       e = p.item;
8       q = p.next;
9       p.item = NIL;
10      if (q == null) goto polltend;
11      this.head = q;
12      p.next = p;
13  polltend:
14      tend();
15  pollreturn:
16      return e;
17  }
```

FIG. 8

```
J9 PPC JIT Code for tmPoll
        tbegin                              # if !tbegin goto return
        bne+        cr0, StartLabel
        li          gr2, 0                  # ret := null
        b           returnLabel
StartLabel:
        lwz         gr3, [gr30, 8]          # p := head
        lwz         gr2, [gr3, 8]           # ret := p.item
        lwz         gr0, [gr3, 12]          # q := p.next
        li          gr4, 0
        stw         [gr3, 8], gr4           # p.item = null
        cmpldi      cr0, gr0, 0             # if q == null goto tend
        beq         cr0, TendLabel
        stw         [gr30, 8], gr0          # head := q
        stw         [gr3, 12], gr3          # p.next = p
TendLabel:
        tend                                # tend
ReturnLabel:                                # return ret
```

FIG. 9

```
J9 zHelix JIT Code for tmPoll
        xgr         gpr7, gpr7              # ret := null
        tbegin                              # if !tbegin goto return
        brc         0x7, returnLabel
        lg          gpr8, 8(gpr12)          # p := head
        lg          gpr7, 8(gpr8)           # ret := p.item
        ltg         gpr9, 12(gpr8)          # q := p.next; q == NULL?
        mvhi        8(gpr8),0               # p.item = null
        brc         0x8, TendLabel          # if q == null goto tend
        stg         gpr9,8(gpr12)           # head := q
        stg         gpr8,12(gpr8)           # p.next = p
TendLabel:
        tend                                # tend
ReturnLabel:
```

FIG. 10

USING HARDWARE TRANSACTIONAL MEMORY FOR IMPLEMENTATION OF QUEUE OPERATIONS

BACKGROUND

A queue refers to a data type used in computing. Within the queue, multiple items can be stored in a particular order. Items can be added or removed from the queue to facilitate processing of the items. Some queues are intended to be used by a single processing thread (thread), while others may be accessed concurrently by more than one different thread.

For example, within the Java™ programming language, a package called java.util.concurrent provides a variety of classes including one referred to as "ConcurrentLinkedQueue". A ConcurrentLinkedQueue, or more generally, a concurrent linked queue, is an unbounded thread-safe queue based on linked nodes. A ConcurrentLinkedQueue is used when many threads will share access to a common collection of items. The class does not permit the use of null elements. The ConcurrentLinkedQueue class provides a set of complex algorithms for managing an instance of a concurrent linked queue in the Java™ programming language.

The ConcurrentLinkedQueue class utilizes volatile variables and atomic operations, in software, to effectuate concurrent queue management. Accesses to variables denoted as "volatile," at least in the Java™ programming language, are typically slower than accesses to regular, or non-volatile, variables. "Atomicity" of an operation refers to a property in which the operation is executed completely or not at all. An atomic operation includes a plurality of instructions. To other processing threads, the operation executes uninterrupted as if a single instruction. Atomic actions cannot be interleaved, so atomic actions can be used without interference from other threads.

The use of volatile variables and atomic operations in managing a concurrent linked queue results in slower execution. This is particularly true when compared to a non-concurrent linked queue implementation.

BRIEF SUMMARY

One or more embodiments disclosed within this specification relate to using hardware transactional memory for implementation of queue operations.

A method includes invoking a first operation for a concurrent linked queue (CLQ) of an interpretive program using a Just-In-Time (JIT) compiler of a virtual machine (VM), wherein the first operation does not use hardware transactional memory (HTM), determining whether a data processing system executing the VM supports HTM, and responsive to determining that the data processing system does support HTM, detecting, using a processor and within the first operation, a call to a second operation that is configured, in byte code, to return an indication of a failed hardware transaction. Responsive to detecting the second operation, a machine code implementation of the first operation that includes a machine code implementation of the second operation is generated. The machine code implementation of the second operation is an implementation of the first operation that does use HTM and is generated in lieu of machine code for the byte code of the second operation that returns the indication of the failed hardware transaction.

A system includes a processor programmed to initiate executable operations. The executable operations include invoking a first operation for a CLQ of an interpretive program using a JIT compiler of a VM, wherein the first operation does not use HTM, determining whether a data processing system executing the VM supports HTM, and responsive to determining that the data processing system does support HTM, detecting, using a processor and within the first operation, a call to a second operation that is configured, in byte code, to return an indication of a failed hardware transaction. Responsive to detecting the second operation, a machine code implementation of the first operation that includes a machine code implementation of the second operation is generated. The machine code implementation of the second operation is an implementation of the first operation that does use HTM and is generated in lieu of machine code for the byte code of the second operation that returns the indication of the failed hardware transaction.

A computer program product includes a computer readable storage medium having program code stored thereon. The program code is executable by a processor to perform a method. The method includes invoking, using the processor, a first operation for a CLQ of an interpretive program using a JIT compiler of a VM, wherein the first operation does not use HTM, determining, using the processor, whether a data processing system executing the VM supports HTM, and responsive to determining that the data processing system does support HTM, detecting, using the processor and within the first operation, a call to a second operation that is configured, in byte code, to return an indication of a failed hardware transaction. Responsive to detecting the second operation, a machine code implementation of the first operation that includes a machine code implementation of the second operation is generated using the processor. The machine code implementation of the second operation is an implementation of the first operation that does use HTM and is generated in lieu of machine code for the byte code of the second operation that returns the indication of the failed hardware transaction.

BRIEF DESCRIPTION OF THE SEVERAL VIEWS OF THE DRAWINGS

FIG. 3 is an example of concurrent linked queue (CLQ) program code in which additional program code has been inserted.

FIG. 4 is an example of CLQ program code in which additional program code has been inserted.

FIG. 5 is pseudo code illustrating an exemplary implementation of the HTM enabled version of tmOffer.

FIG. 6 is an example of an assembly code implementation of tmOffer.

FIG. 7 is an example of another assembly code implementation of tmOffer.

FIG. 8 is pseudo code illustrating an exemplary implementation of the HTM enabled version of tmPoll.

FIG. 9 is an example of an assembly code implementation of tmPoll.

FIG. 10 is an example of another assembly code implementation of tmPoll.

DETAILED DESCRIPTION

Figure 1:
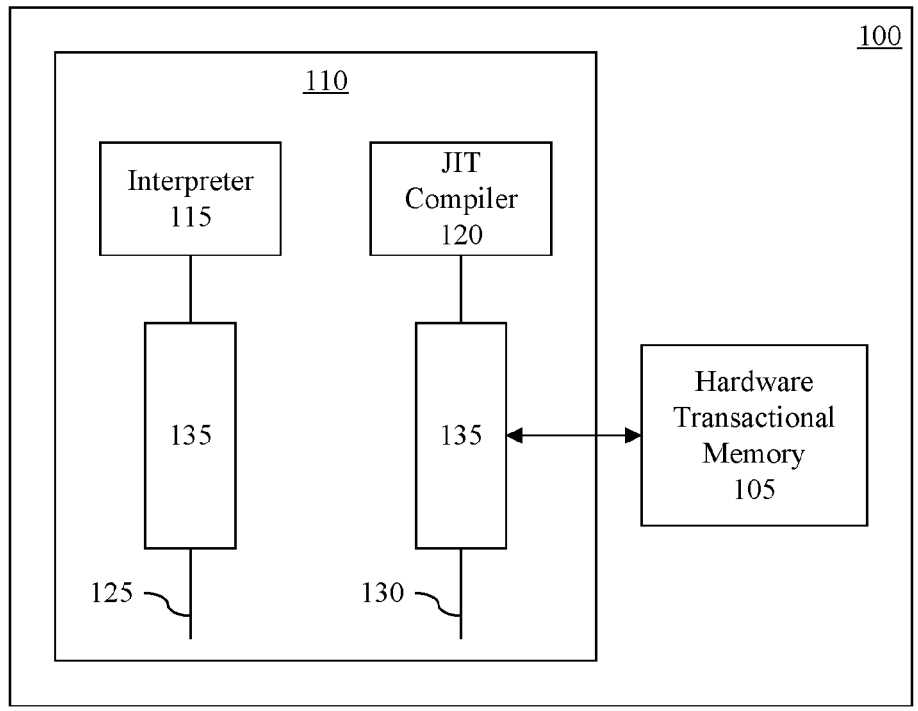
FIG. 1 is a block diagram illustrating an exemplary system configured to perform queue operations.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer-readable program code embodied, e.g., stored, thereon.

Any combination of one or more computer-readable medium(s) may be utilized. The computer-readable medium may be a computer-readable signal medium or a computer-readable storage medium. A computer-readable storage medium may be, for example, but is not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

This specification relates to using hardware transactional memory (HTM) for implementing concurrent linked queue (CLQ) operations. More particularly, this specification relates to implementing CLQ operations so that the operations run correctly whether or not HTM is used for the operations. In accordance with the inventive arrangements disclosed herein, when HTM is available, particular CLQ operations may be replaced with HTM versions of the operations. When HTM is not available, the non-HTM operations, e.g., default operations, may be implemented. Accordingly, in the usual case, the use of HTM versions of the operations results in faster operation compared to conventional CLQ operations where HTM is not utilized. Further, the system need not be modified from one system to another according to whether the system supports HTM as HTM availability detection is performed automatically.

FIG. 1 is a block diagram illustrating an exemplary system 100 configured to perform queue operations. More particularly, system 100 is configured to perform CLQ operations. System 100 is implemented as a data processing system, e.g., a computer system. In the example pictured in FIG. 1, system 100 supports HTM. While this functionality is represented as a block 105, it should be appreciated that HTM may be implemented using a combination of hardware components of a data processing system.

HTM is a concurrency control mechanism that is used for shared memory in a concurrent computing environment. HTM is implemented using hardware of the data processing system. For example, HTM can be implemented within, or as part of, a processor, as cache and bus protocol to support transactions, etc. HTM simplifies concurrent programming by allowing a set of instructions, e.g., an operation, to execute in an atomic way. An atomic operation, also referred to as the property of "atomicity," refers to an operation, formed of a plurality of instructions, that cannot be broken up into smaller parts that could be performed by different processors or processing threads (threads) as the case may be.

As pictured, system 100 executes, or includes, a virtual machine 110. A virtual machine (VM) is a software implementation of a machine such as a computer that executes, or runs, programs like a physical machine. In one example, VM 110 is a Java™ Virtual Machine or a Java™ Runtime Environment. In general, VM 110 is responsible for implementing programs written in an interpretive language.

An interpretive language is a computer programming language in which each instruction is immediately translated and acted upon by the computer, as opposed to a compiler which compiles the entire program into machine code before a single instruction is executed. Thus, a program written in an interpretive language in human readable format, e.g., source code, is translated or compiled into an intermediate format referred to as byte code. Byte code is directly executable by VM 110, but is not natively, or directly, executable by system 100, e.g., a central processing unit or processor of system 100, without VM 110. As an example, a Java™ source code program is compiled into a Java™ byte code program that is executable by VM 110. The Java™ byte code program, however, is not directly or natively executable by system 100 without VM 110.

VM 110 includes an interpreter 115 and a Just-In-Time (JIT) compiler 120. One or more portions of a byte code program are implemented by interpreter 115. Interpreter 115, for example, translates byte code into actions or operating system calls that are specific to system 100. One or more portions of the byte code program also can be compiled at runtime by JIT compiler 120 for execution by system 100 as machine code. Machine code refers to a set of instructions specified as binary digits that are directly, e.g., natively, executable by the processor of a data processing system such as system 100.

FIG. 1 illustrates a case in which a thread 125 is implemented by interpreter 115. A different thread 130 is implemented by JIT compiler 120. Each thread can support or execute one or more tasks. The threads can execute concurrently and independently of one another. Thus, a thread may execute one or more operations that are implemented by interpreter 115, while other threads may execute one or more operations that are implemented by JIT compiler 120. For purposes of illustration, an operation 135, e.g., a particular portion of byte code of the program being executed by VM 110, can be independently run on each of threads 125 and 130. In one aspect, operation 135 is one for processing a CLQ.

As noted, a queue refers to a data type used in computing. Within the queue, multiple items can be stored in a particular order. Items can be added or removed from the queue to facilitate processing of the items. Some queues are intended to be used by a single processing thread (thread), while others may be accessed concurrently by more than one different thread.

Within the Java™ programming language, a package called java.util.concurrent provides a variety of classes including one referred to as "ConcurrentLinkedQueue". The Java™ ConcurrentLinkedQueue is one example of a CLQ. As discussed, a CLQ is an unbounded thread-safe queue based on linked nodes. A CLQ is used when many threads will share access to a common collection of items. The ConcurrentLinkedQueue class does not permit the use of null elements. The ConcurrentLinkedQueue class in Java™ provides a set of complex algorithms for managing an instance of a CLQ in the Java programming language.

When implemented by interpreter 115, operation 135 utilizes non-HTM CLQ operations. The non-HTM operations are substantially default operations. For example, the default operations that are part of the ConcurrentLinkedQueue class in Java™ are non-HTM. When operation 135 is implemented using JIT compiler 120, however, HTM 105 can be used as described in greater detail within this specification.

Figure 2:
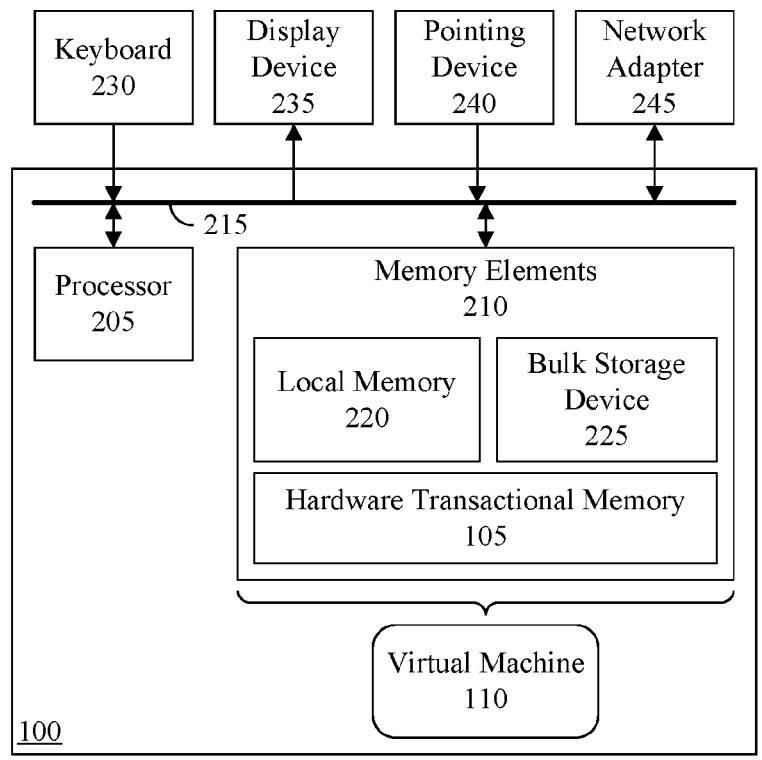
FIG. 2 is a block diagram illustrating an exemplary implementation of the system of FIG. 1.

FIG. 2 is a block diagram illustrating an exemplary implementation of system 100 of FIG. 1. System 100 can include at least one processor 205, e.g., a central processing unit, coupled to memory elements 210 through a system bus 215 or other suitable circuitry. As such, system 100 can store program code within memory elements 210. Processor 205 executes the program code accessed from memory elements 210 via system bus 215 or the other suitable circuitry.

In one aspect, system 100 is implemented as a computer or other programmable data processing apparatus that is suitable for storing and/or executing program code. It should be appreciated, however, that system 100 can be implemented in the form of any system including a processor and memory that is capable of performing and/or initiating the functions and/or operations described within this specification. Further, system 100 can be implemented in any of a variety of different form factors including, but not limited to, a portable device such as a mobile communication device, a tablet computing and/or communication device, a laptop computing device, a desktop computing device, a server, or the like.

Memory elements 210 include one or more physical memory devices such as, for example, local memory 220 and one or more bulk storage devices 225. Local memory 220 refers to RAM or other non-persistent memory device(s) generally used during actual execution of the program code. Bulk storage device(s) 225 can be implemented as a hard disk drive (HDD), solid state drive (SSD), or other persistent data storage device. System 100 also can include one or more cache memories (not shown) that provide temporary storage of at least some program code in order to reduce the number of times program code must be retrieved from bulk storage device 225 during execution.

Memory elements 210 further include HTM 105. As noted with respect to FIG. 1, HTM 105 can be implemented using any of a variety of components of system 100 such as processor 205, system bus 215, particular bus protocols, and/or the like. HTM 105 is represented within memory elements 210 simply to illustrate the capabilities of system 100 as including HTM.

Input/output (I/O) devices such as a keyboard 230, a display 235, and a pointing device 240 optionally can be coupled to system 100. The I/O devices can be coupled to system 100 either directly or through intervening I/O controllers. One or more network adapters 245 also can be coupled to system 100 to enable system 100 to become coupled to other systems, computer systems, remote printers, and/or remote storage devices through intervening private or public networks. Modems, cable modems, wireless transceivers, and Ethernet cards are examples of different types of network adapters 245 that can be used with system 100.

As pictured in FIG. 2, memory elements 210 can store a VM 110. VM 110, being implemented in the form of executable program code, is executed by system 100 and, as such, is considered an integrated part of system 100. VM 110 can include a library of available functions including operations for processing CLQs. VM 110, including any parameters and/or attributes utilized by VM 110, byte code implemented or otherwise used by VM 110, and/or machine code generated by VM 110, are functional data structures that impart functionality when employed as part of system 100.

In one aspect, one or more operations are added to the program code responsible for CLQ operations. The added operations allows the CLQ operation to run correctly without invoking HTM, e.g., when HTM is not available, and also to run correctly when using HTM. For example, the added operations provide HTM support and can be used in lieu of, or replace, various non-HTM operations of the CLQ program code in particular situations. The added operations that provide HTM support are fully compatible with the non-HTM operations.

The added operations that support HTM can perform functions such as, for example, recognizing a transient state of a CLQ object and transition the transient state into a valid state that is recognizable by other HTM-based operations or the default non-HTM operations. The added operations can perform such functions in a manner that, in the usual case, is faster than the default non-HTM operations. The added operations are faster because unnecessarily complex steps involving the use of volatile variables, atomic operations in software, etc. and the ensuing overhead are avoided. As such, the resulting CLQ program code with HTM functionality executes faster in the general case than conventional CLQ program code.

The CLQ program code with added operations disclosed herein preserves the ability to run without HTM support and allows HTM-based operations to interact correctly with the default non-HTM operations. Within a system without HTM support, the CLQ program code runs substantially as expected with respect to conventional implementations. Within a system with HTM support, however, the CLQ program code performs significantly faster than conventional implementations.

FIG. 3 is an example of CLQ program code in which additional program code has been inserted. More particularly, FIG. 3 is an example of the offer operation that is a member of the CLQ class in the Java™ programming language. At line 9, the instruction if (tmOffer(newNode)) return true is added to the default or non-HTM operation offer. The operation tmOffer further is added to the CLQ class. As illustrated, tmOffer is called by offer. The compiled tmOffer program code, i.e., the byte code, returns the value "false" when implemented by the interpreter of the VM. Because the byte code implementation of tmOffer is configured to return an indication of a failed hardware transaction, e.g., the "false" value, the byte code implementation of tmOffer can be said to be a non-HTM operation. Similarly, the offer operation is a non-HTM operation.

FIG. 4 is an example of CLQ program code in which additional program code has been inserted. More particularly, FIG. 4 is an example of the poll operation that is a member of the CLQ class in the Java™ programming language. At lines 2-3, the instructions Ee=tmPoll( ) and if (e !=null) return e; have been added. The operation tmPoll further is added to the CLQ class. As illustrated, tmPoll is called by poll. The compiled tmPoll program code, i.e., the byte code, returns a value "false" when implemented by the interpreter of the VM. Because the byte code implementation of tmPoll is configured to return an indication of a failed hardware transaction, e.g., the "false" value, the byte code implementation of tmPoll can be said to be a non-HTM operation. Similarly, the poll operation is a non-HTM operation.

In each of FIGS. 3 and 4, the default implementations of tmOffer and tmPoll are designed to mimic the behaviour of the HTM implementations of tmOffer and tmPoll, respectively, when hardware transactions fail. Thus, when the default operations offer and poll are used, the behavior of the CLQ class is unaffected.

When HTM is available within the system, however, the JIT compiler intercepts calls to one or both of tmOffer and tmPoll. The JIT compiler is configured to recognized calls to tmOffer and tmPoll and generate HTM enabled machine code (HTM machine code) for each respective operation when intercepted. The particular machine code generated follows the implementations described with reference to FIG. 5 for tmOffer and FIG. 8 for tmPoll as opposed to generating machine code for the actual byte code of each respective operation. The HTM machine code generated by the JIT compiler is shorter and faster than the default versions of both offer and poll. Further, the HTM machine code for tmOffer and tmPoll operates concurrently and correctly with the non-HTM offer and Poll operations.

When HTM is not available within the system and the JIT compiler is used, the JIT compiler generates machine code for the actual byte code of tmOffer and/or the actual byte code of tmPoll as the case may be. As such, the generated machine code returns an indication that a hardware transaction failed.

FIG. 5 is pseudo code illustrating an exemplary implementation of the HTM enabled version of tmOffer. More particularly, FIG. 5 illustrates the functionality of the machine code that is generated automatically by the JIT compiler when the call to tmOffer from within offer is intercepted by the JIT compiler and HTM is available within the system.

In lines 1-4, the tmOffer operation starts a hardware transaction. If the transaction fails, at any time during the course of execution of tmOffer, the value "false" is returned and the tmOffer operation returns to offer. The value "false" will be returned under a variety of different circumstances. For example, tbegin is really an activity that is performed in hardware and is ongoing. The system continues to monitor execution of all instructions between tbegin and tend to ensure that the instructions are executed as what appears to other threads as a single instruction. tbegin invokes the HTM functionality during all instructions between tbegin and tend.

For example, if at any point during execution of the tmOffer operation, the tmOffer operation is interrupted by another operation or access to memory such that atomicity of the tmOffer operation is violated, the value "false" is returned. Once tmOffer returns a "false" value, lines 10-24 of offer are executed. If the value "false" is not returned from tmOffer, the operation offer returns without executing lines 10-24 since tmOffer successfully performed CLQ processing.

Continuing at line 5 of FIG. 5, implementation of tmOffer continues. In line 6, the tail of the CLQ is read. In line 7, the next pointer of the tail of the CLQ is read. If the next pointer of the tail is null, as determined in line 8, then execution continues to line 14. In lines 15 and 16, n, which represents the new node, is inserted. The tail of the CLQ is set to n and the operation is committed. Further, the value "true" is set to be returned.

If the next pointer of the tail is not null, as determined in line 8, then the next pointer of the next node of the tail is read in lines 9-10. If the next pointer of the next node of the tail is null, then execution continues at line 14 as previously described. If the next pointer of the next node of the tail is not null, however, tmOffer determines that the particular case is uncommon and should be handled by the non-HTM offer program code. As such, the value "false" is set and tmOffer returns.

FIG. 6 is an example of an assembly code implementation of tmOffer. FIG. 6 illustrates a version of tmOffer specified in PowerPC® assembly language.

FIG. 7 is an example of another assembly code implementation of tmOffer. FIG. 7 illustrates a version of tmOffer specified in System Z assembly language.

FIG. 8 is pseudo code illustrating an exemplary implementation of the HTM enabled version of tmPoll. More particularly, FIG. 6 illustrates the functionality of the machine code that is generated automatically by the JIT compiler when the call to tmPoll from within poll is intercepted by the JIT compiler and HTM is available within the system.

In line 2, the tmPoll operation starts a hardware transaction. If the transaction fails, at any time during the course of execution of tmPoll, the value null is returned and the tmPoll operation returns to poll. The value null will be returned under a variety of different circumstances. As noted with respect to tmOffer, tbegin is really an activity that is performed in hardware and is ongoing. The system continues to monitor execution of all instructions between tbegin and tend within tmPoll to ensure that the instructions are executed as what appears to other threads as a single instruction.

In line 6, tmPoll reads the head pointer variable. The head variable has an item portion and a next pointer portion. In line 9, tmPoll sets the item just read to null indicating that the node was consumed or taken. In line 10, tmPoll checks the next item, which is stored in the variable q. If the next item is null, tmPoll continues to polltend where the operation is committed. In that case, the only node in the CLQ has been taken. The null node is left in place. The operation tmPoll returns to poll with the read item. Since the result is not null, upon return to poll, the non-HTM program code of poll is not executed. Rather, the poll returns.

If, however, the next pointer is not null, as determined in line 10, lines 11 and 12 are executed which update the head to point to the next node. In order to conform with the poll operation, the node p is made to point to itself. Standard garbage collection functions can identify node p as self-referential and collect the node. The tmPoll operation then continues to polltend where the operation is committed and returns. The variable e includes the value read unless a failure occurs, which renders e null.

FIG. 9 is an example of an assembly code implementation of tmPoll. FIG. 9 illustrates a version of tmPoll specified in PowerPC® assembly language.

FIG. 10 is an example of another assembly code implementation of tmPoll. FIG. 10 illustrates a version of tmPoll specified in System Z assembly language.

Referring to FIGS. 6, 7, 9, and 10, the illustrations of tmOffer and tmPoll in assembly language are provided for purposes of illustration only. In one aspect, the JIT compiler can store appropriate and alternate internal representations of each of the tmOffer and tmPoll operations from which HTM machine code can be generated. The internal representations stored within the JIT compiler can be in byte code, another programming language such as assembly, or the like. In another aspect, the JIT compiler can store the HTM machine code for each of tmOffer and tmPoll so that the HTM machine code can be output responsive to intercepting a call to tmOffer or tmPoll as the case may be. For example, the machine code can be generated before runtime of the system and stored. The machine code is executed when needed. Regardless of the way in which machine code is provided for either tmOffer or tmPoll, the JIT compiler is said to "generate" the appropriate machine code responsive to intercepting a call to tmOffer or tmPoll, as the case may be.

Figure 11:
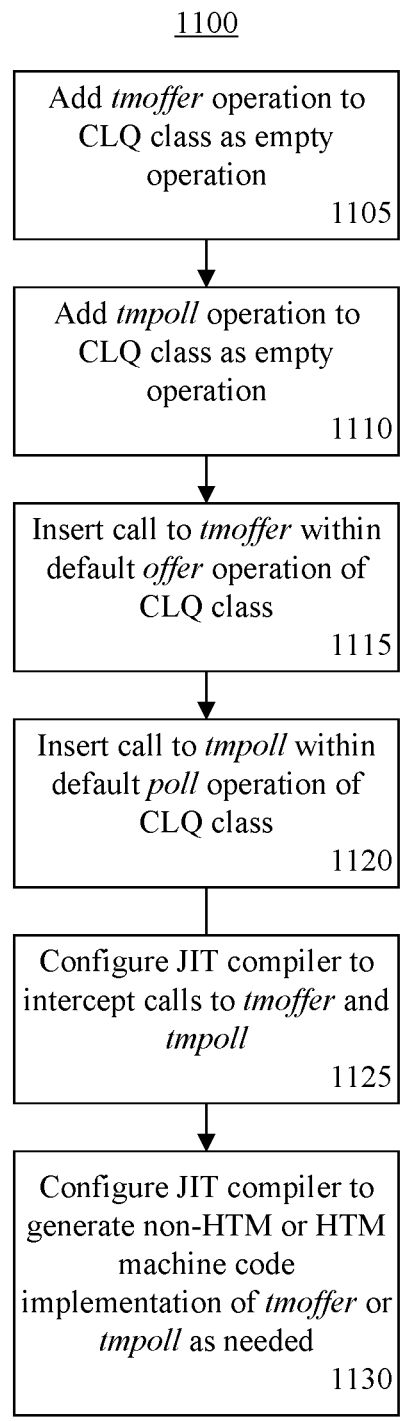
FIG. 11 is a flow chart of an exemplary method of implementing a virtual machine as described within this specification.

FIG. 11 is a flow chart of an exemplary method 1100 of implementing a VM as described within this specification. FIG. 11 describes the process of configuring a VM to utilize HTM when available. Method 1100 can be performed using an appropriate data processing system such as the data processing system described with reference to FIG. 2 to perform the following operations. For example, the data processing system can include a programming tool or other programming environment through which the functions described in method 1100 are performed. The operations described in method 1100 are performed prior to runtime of the VM.

In block 1105, the system adds a tmOffer operation to the CLQ class used by the VM. In one aspect, the tmOffer behaves as if a hardware transaction has failed. For example, in the case of Java, the tmOffer method includes program code that returns a failure indication for a hardware transaction. In block 1110, the system adds a tmPoll operation to the CLQ class used by the VM. The tmPoll operation also can be specified to behave as if a hardware transaction has failed.

In block 1115, the system inserts a call to tmOffer within the default Offer operation, e.g., the non-HTM offer program code of the CLQ class. The call to tmOffer can be inserted into offer as described with reference to FIG. 3. In block 1120, the system inserts a call to tmPoll within the default poll operation, e.g., the non-HTM poll program code of the CLQ class. The call to tmPoll can be inserted into poll as described with reference to FIG. 4.

In block 1125, the system configures the JIT compiler of the VM to intercept calls to tmOffer and calls to tmPoll. Intercepting calls to tmOffer and tmPoll ensures that each of the operations tmOffer and tmPoll are executed using JIT compilation. In block 1130, the system configures the JIT compiler to generate non-HTM and HTM machine code implementations of tmOffer and tmPoll as needed. The JIT compiler determines whether HTM is available within the system. When HTM is not available, the JIT compiler generates non-HTM machine code for tmOffer and/or tmPoll. When HTM is available, the JIT compiler generates the HTM machine code for tmOffer and/or tmPoll. The machine code implementations are generated responsive to detecting a call to tmOffer and/or tmPoll as the case may be. Thus, responsive to detecting a call to tmOffer, the appropriate machine code for tmOffer is generated. Responsive to detecting a call to tmPoll, the appropriate machine code for tmPoll is generated.

As noted, "generating" machine code can mean that the machine code is generated from some intermediate representation such as byte code, assembly, or the like. Generating machine code also can mean that the JIT compiler stores machine code implementations as executable code in a library that is access or executed as needed, e.g., responsive to intercepting tmPoll or tmOffer as the case may be. Generating machine code further can mean that the JIT compiler is hardcoded to generate or otherwise output the machine code using any of a variety of known programming techniques, e.g., algorithmic or the like.

Figure 12:
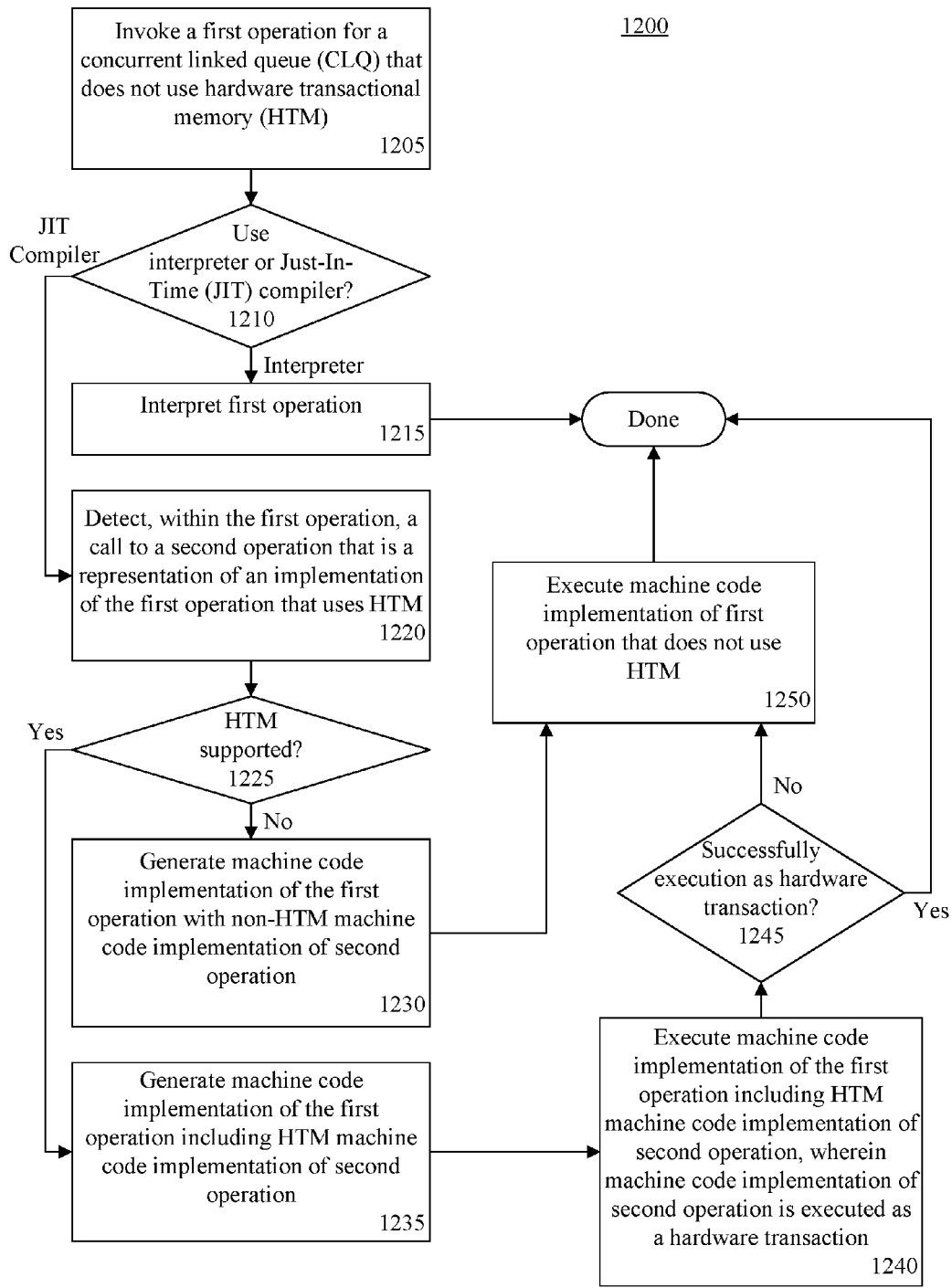
FIG. 12 is a flow chart illustrating an exemplary method of operation of a data processing system executing a virtual machine as described within this specification.

FIG. 12 is a flow chart illustrating an exemplary method 1200 of operation of a data processing system executing a VM as described within this specification. Method 1200 can be performed by a data processing system as described with reference to FIGS. 1 and 2 of this specification. Method 1200 can be implemented for any of a variety of multi-threaded computing environments. Method 1200 can begin in a state where the CLQ class has been modified to include operations for tmOffer and tmPoll. Further, a call to tmOffer has been inserted into offer. A call to tmPoll has been inserted into poll. The JIT compiler has been configured to generate machine code versions of each of tmOffer and tmPoll as described within this specification.

In block 1205, the system invokes a first operation for a CLQ. The first operation does not use HTM, e.g., is non-HTM. For example, the offer or poll operations can be invoked within the VM. In block 1210, the system determines whether the first operation is to be interpreted or JIT compiled. The system determines whether the first operation is to be implemented using the interpreter or by JIT compiling the first operation into machine code for native execution by the system. If the system determines that the first operation is to be interpreted, method 1200 continues to block 1215. If the system determines that the first operation is to be implemented using the JIT compiler, method 1200 continues to block 1220.

In block 1215, the interpreter interprets the first operation. For purposes of illustration, when the first operation is offer, the second operation is tmOffer. Similarly, when the first operation is poll, the second operation is tmPoll. Accordingly, consider the case in which the first operation is offer. In that case, the first operation includes a call to the second operation tmOffer. Accordingly, when the first operation is interpreted by the interpreter of the VM, the second operation is interpreted and returns an indication of a failed hardware transaction. The indication of the failed hardware transaction allows the first operation offer to be implemented or continue as if the call to the second operation tmOffer was not be inserted into offer. After block 1215, method 1200 can end. It should be appreciated that method 1200 can be repeated as may be required within an actual runtime situation.

Continuing with block 1220, the system and, more particularly, the JIT compiler, detects within the first operation the call to the second operation. In block 1225, the system and, more particularly, the JIT compiler determines whether the system executing the VM supports HTM. In one aspect, the JIT compiler is configured to include, or store, runtime information about the data processing system, e.g. the hardware, upon which the VM and JIT compiler are executing. As such, the JIT compiler is able to determine whether the system supports HTM. If so, method 1200 proceeds to block 1235. If not, method 1200 continues to block 1230.

In block 1230, in the case where the system does not support HTM, the system and, more particularly, the JIT compiler, generates a machine code implementation of the first operation. The machine code implementation of the first operation includes a machine code implementation of the second operation. Since HTM functionality is not supported, the JIT compiler generates machine code from the byte code of the second operation. As such, the machine code for the second operation returns an indication of a failed hardware transaction. Thus, if the first operation is offer, machine code for offer is generated that includes a machine code implementation of the byte code of tmOffer. Similarly, if the first operation is poll, machine code for Poll is generated that includes machine code for the byte code of tmPoll. Accordingly, method 1200 continues to block 1250 where the machine code implementation of the first operation that does not use HTM is executed due to the machine code for the second operation returning the indication of a failed hardware transaction. After block 1250, method 1200 can end.

In block 1235, where the JIT compiler determines that the system does support HTM, the system and, more particularly, the JIT compiler, generates a machine code implementation of the first operation that includes a machine code implementation of the second operation. Rather than generating machine code for the actual byte code of the second operation, however, the JIT compiler generates machine code for the second operation that is HTM enabled. The machine code generated for the second operation implements an HTM enabled version of the first operation, i.e., machine code for tmOffer or tmPoll as described with reference to FIGS. 5 and 8. The second operation, or call thereto within the first operation, represents an implementation of the first operation that does use HTM. In one aspect, the JIT compiler is configured, or programmed, to output the machine code implementation of the second operation that performs the functionality described.

In block 1240, the system executes the machine code implementation of the first operation that includes the HTM machine code implementation of the second operation. In executing the machine code, the machine code implementation of the second operation is executed as a hardware transaction using the HTM functionality of the system.

In block 1250, the system determines whether the machine code implementation of the second operation executed successfully as a hardware transaction. As noted, the HTM machine code implementation of the second operation returns an indication of whether execution was successful as a hardware transaction. If so, method 1200 can end. If execution was not successful, however, method 1200 continues to block 1250 where the remainder of the machine code implementation of the first operation is executed without using HTM.

For example, when execution of the HTM machine code implementation of the second operation is interrupted, method 1200 would continue to block 1250 to execute the machine code implementation of the first operation that does not utilize HTM. In the case of a failure, the hardware of the system unwinds or rolls back all of the states that occurred during execution of the machine code for the second operation prior to the failure. As such, the second operation appears to either have succeeded or failed without any ambiguity or indication of partial success. After block 1250, method 1200 can end.

The embodiments disclosed within this specification provide methods, systems, and apparatus for performing CLQ operations. The embodiments can utilize HTM functionality when available within the data processing system and utilize non-HTM CLQ operations when HTM functionality is not available. In the general case, the embodiments perform significantly faster than conventional approaches that do not utilize HTM. Moreover, the embodiments disclosed herein provide flexibility in that the same implementation, e.g., VM, can be utilized whether or not the data processing system supports HTM functionality without incurring any significant performance penalty in the case where the data processing system does not support HTM functionality.

This specification relates to using hardware transactional memory for implementing CLQ operations. More particularly, this specification relates to implementing CLQ operations so that the operations run correctly whether or not HTM is used for the operations. In accordance with the inventive arrangements disclosed herein, when HTM is available, particular CLQ operations are effectively replaced with HTM versions of the operations when using the JIT compiler. When HTM is not available, the default non-HTM operations are implemented. Accordingly, in the usual case, the use of HTM versions of the operations results in faster operation compared to conventional CLQ operations where HTM is not utilized. Further, the system need not be modified from one system to another according to whether the system supports HTM as HTM availability detection is performed automatically.

The flowcharts and block diagrams in the Figures illustrate the architecture, functionality, and operation of possible implementations of systems, methods and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Reference throughout this specification to "one embodiment," "an embodiment," or similar language means that a particular feature, structure, or characteristic described in connection with the embodiment is included in at least one embodiment disclosed within this specification. Thus, appearances of the phrases "in one embodiment," "in an embodiment," and similar language throughout this specification may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The corresponding structures, materials, acts, and equivalents of all means or step plus function elements in the claims below are intended to include any structure, material, or act for performing the function in combination with other claimed elements as specifically claimed. The description of the embodiments disclosed within this specification have been presented for purposes of illustration and description, but are not intended to be exhaustive or limited to the form disclosed. Many modifications and variations will be apparent to those of ordinary skill in the art without departing from the scope and spirit of the embodiments of the invention. The embodiments were chosen and described in order to best explain the principles of the invention and the practical application, and to enable others of ordinary skill in the art to understand the inventive arrangements for various embodiments with various modifications as are suited to the particular use contemplated.

What is claimed is:

1. A method, comprising:
    invoking a first operation, that does not use hardware transactional memory, for a concurrent linked queue of an interpretive program using a Just-In-Time (JIT) compiler of a virtual machine;
    determining whether a data processing system executing the virtual machine supports hardware transactional memory;
    detecting within the first operation, responsive to determining that the data processing system does support hardware transactional memory, a call to a second operation that is configured, in byte code, to return an indication of a failed hardware transaction; and
    generating, responsive to detecting the second operation, a machine code implementation of the first operation that includes a machine code implementation of the second operation and does not use hardware transactional memory.

2. The method of claim 1, further comprising:
    executing the machine code implementation of the first operation that does not use hardware transactional memory.

3. The method of claim 1, wherein
    the machine code implementation of the second operation is machine code for the byte code of the second operation that returns the indication of the failed hardware transaction.

4. The method of claim 1, further comprising:
executing the first operation using an interpreter of the virtual machine, wherein
execution of the second operation returns the indication of the failed hardware transaction.

5. A computer hardware system, comprising:
a hardware processor configured to initiate the following executable operations:
  invoking a first operation, that does not use hardware transactional memory, for a concurrent linked queue of an interpretive program using a Just-In-Time (JIT) compiler of a virtual machine;
  determining whether a data processing system executing the virtual machine supports hardware transactional memory;
  detecting within the first operation, responsive to determining that the data processing system does support hardware transactional memory, a call to a second operation that is configured, in byte code, to return an indication of a failed hardware transaction; and
  generating, responsive to detecting the second operation, a machine code implementation of the first operation that includes a machine code implementation of the second operation and does not use hardware transactional memory.

6. The system of claim 5, wherein the hardware processor is further configured to initiate the following executable operation:
  executing the machine code implementation of the first operation that does not use hardware transactional memory.

7. The system of claim 5, wherein
the machine code implementation of the second operation is machine code for the byte code of the second operation that returns the indication of the failed hardware transaction.

8. The system of claim 5, wherein the hardware processor is further configured to initiate the following executable operations:
  executing the first operation using an interpreter of the virtual machine, wherein
  execution of the second operation returns the indication of the failed hardware transaction.

9. A computer program product, comprising:
a computer readable memory having program code stored thereon,
the program code, which when executed by a computer hardware system, causes the computer hardware system to perform:
  invoking a first operation, that does not use hardware transactional memory, for a concurrent linked queue of an interpretive program using a Just-In-Time (JIT) compiler of a virtual machine;
  determining whether a data processing system executing the virtual machine supports hardware transactional memory;
  detecting within the first operation, responsive to determining that the data processing system does support hardware transactional memory, a call to a second operation that is configured, in byte code, to return an indication of a failed hardware transaction; and
  generating, responsive to detecting the second operation, a machine code implementation of the first operation that includes a machine code implementation of the second operation and does not use hardware transactional memory.

10. The computer program product of claim 9, wherein the program code further causes the computer hardware system to perform:
  executing the machine code implementation of the first operation that does not use hardware transactional memory.

11. The computer program product of claim 9, wherein
the machine code implementation of the second operation is machine code for the byte code of the second operation that returns the indication of the failed hardware transaction.

12. The computer program product of claim 9, wherein the program code further causes the computer hardware system to perform:
  executing the first operation using an interpreter of the virtual machine, wherein
  execution of the second operation returns the indication of the failed hardware transaction.

* * * * *